(12) United States Patent
Wang

(10) Patent No.: US 9,331,731 B2
(45) Date of Patent: May 3, 2016

(54) WIRELESS CHARGE WRISTBAND-TYPE MOBILE COMMUNICATION DEVICE

(71) Applicant: COREMATE TECHNICAL CO., LTD., Taoyuan County (TW)

(72) Inventor: Robert Wang, Taoyuan County (TW)

(73) Assignee: COREMATE TECHNICAL CO., LTD., Taoyuan County (TW)

( * ) Notice: Subject to any disclaimer, the term of this patent is extended or adjusted under 35 U.S.C. 154(b) by 0 days.

(21) Appl. No.: 14/945,193

(22) Filed: Nov. 18, 2015

(65) Prior Publication Data

US 2016/0072536 A1    Mar. 10, 2016

Related U.S. Application Data

(63) Continuation-in-part of application No. 14/151,179, filed on Jan. 9, 2014, now abandoned.

(51) Int. Cl.
*H04B 1/38* (2015.01)
*H04B 1/3827* (2015.01)
*H04M 1/725* (2006.01)

(52) U.S. Cl.
CPC ............... *H04B 1/385* (2013.01); *H04M 1/725* (2013.01)

(58) Field of Classification Search
CPC ...................................... H02J 7/02; H02J 7/00
See application file for complete search history.

(56) References Cited

U.S. PATENT DOCUMENTS

| 2009/0280861 A1* | 11/2009 | Khan | H04B 1/3827 455/556.1 |
| 2013/0300204 A1* | 11/2013 | Partovi | H01F 38/14 307/104 |
| 2014/0187157 A1* | 7/2014 | Liao | H04B 5/0037 455/41.1 |
| 2014/0295918 A1* | 10/2014 | Grifoni | H04M 1/7253 455/566 |

* cited by examiner

*Primary Examiner* — Tammy Pham
*Assistant Examiner* — Idowu O Osifade
(74) *Attorney, Agent, or Firm* — Ming Chow; Sinorica, LLC

(57) ABSTRACT

A wireless charge wristband-type mobile communication device includes a base. The base has an engaging trough. A power supply coil and a first charge coil are embedded in the base. The base is provided with two wristbands. Each wristband is provided with at least one first battery therein. The coil of the base is electrically connected with the first battery. The engaging trough is provided with a display. A second charge coil and a second battery electrically connected with the second charge coil are embedded in the display. The display is coupled by the engaging trough. The electrical energy can be transmitted in the way of electromagnetic induction to the display anytime and anywhere. During electrical energy transmission, the user can take the display along at will. Besides, through a wireless power supply device, the display can be charged wirelessly to enhance the convenience of the display.

4 Claims, 3 Drawing Sheets

WIRELESS CHARGE WRISTBAND-TYPE MOBILE COMMUNICATION DEVICE

This application is a continuation-in-part of U.S. patent application Ser. No. 14/151,179 filed on Jan. 9, 2014.

BACKGROUND OF THE INVENTION

1. Field of the Invention

The present invention relates to a wireless charge device, and more particularly to a wireless charge wristband-type mobile communication device.

2. Description of the Prior Art

These days, mobile communication devices are widely used, such as smart cell phones, smart watches, and the like. Along with the development of electronic technique, the functions of the mobile communication devices are increasing day by day. A mobile communication device becomes an essential appliance in our modern life. However, the mobile communication device needs electricity when in use. The conventional mobile communication device proceeds with electrical energy transmission through a wired power supply device. By using the wired power supply device to proceed with electrical energy transmission for the mobile communication device, the range for the user to use the mobile communication device is limited to where the wired power supply device is located. The mobile communication device cannot be charged anytime and anywhere. During the use of the mobile communication device, the mobile communication device may have a shortage of power. When the user wants to proceed with electrical energy transmission for the mobile communication device, the mobile communication device must be connected with the wired power supply device to supply the required power. This is not convenient for operation. In addition, the connection of the mobile communication device and the wired power supply device may have the risk of electric leakage. Accordingly, the inventor of the present invention has devoted himself based on his many years of practical experiences to solve this problem.

SUMMARY OF THE INVENTION

The primary object of the present invention is to provide a wireless charge wristband-type mobile communication device. The mobile communication device can be charged anytime and anywhere, without connection points for electrical energy transmission. During electrical energy transmission, the user can take the mobile communication device along at will. It is convenient and safe to carry and use the mobile communication device.

In order to achieve the aforesaid object, the wireless charge wristband-type mobile communication device of the present invention comprises a base and a display. The top of the base has an engaging trough. Two sides of the base are provided with a pair of wristbands. Each wristband is provided with at least one first battery therein. The first battery is rechargeable and able to store electrical energy. A first charge coil is provided and embedded in the bottom of the base. The first charge coil is electrically connected with the first battery for external wireless charge and transmitting the electrical energy to the first battery. The top of the base is provided with a power supply coil embedded above the first charge coil. The power supply coil is electrically connected with the first battery, enabling the electrical energy of the first battery to be transmitted wirelessly. The display is provided with an engaging block corresponding to the engaging trough. The engaging block is coupled to the engaging trough. A second charge coil is provided and embedded in the bottom of the display for external wireless charge and receiving the electrical energy transmitted by the power supply coil. The display is provided with a second battery therein. The second battery is electrically connected with the second charge coil. The second battery is rechargeable and able to store the electrical energy. Thereby, the base is first charged wirelessly by means of external power supply and then the display is charged wirelessly by means of the base. Alternatively, the display is directly charged wirelessly by means of external power supply.

The wireless charge wristband-type mobile communication device the present invention is provided with the first charge coil and the power supply coil embedded in the base. The display is provided with the second charge coil corresponding to the power supply coil. When the display is coupled to the base, the electrical energy can be transmitted in the way of electromagnetic induction. The display can proceed with electrical energy transmission anytime and anywhere. During electrical energy transmission, the user can take the display along at will. Besides, through the primary coil of a wireless power supply device, the electrical energy can be transmitted in the way of electromagnetic induction to the second charge coil of the display. The display can be used more conveniently and the safety can be enhanced.

DETAILED DESCRIPTION OF THE PREFERRED EMBODIMENTS

Embodiments of the present invention will now be described, by way of example only, with reference to the accompanying drawings.

Figure 1:
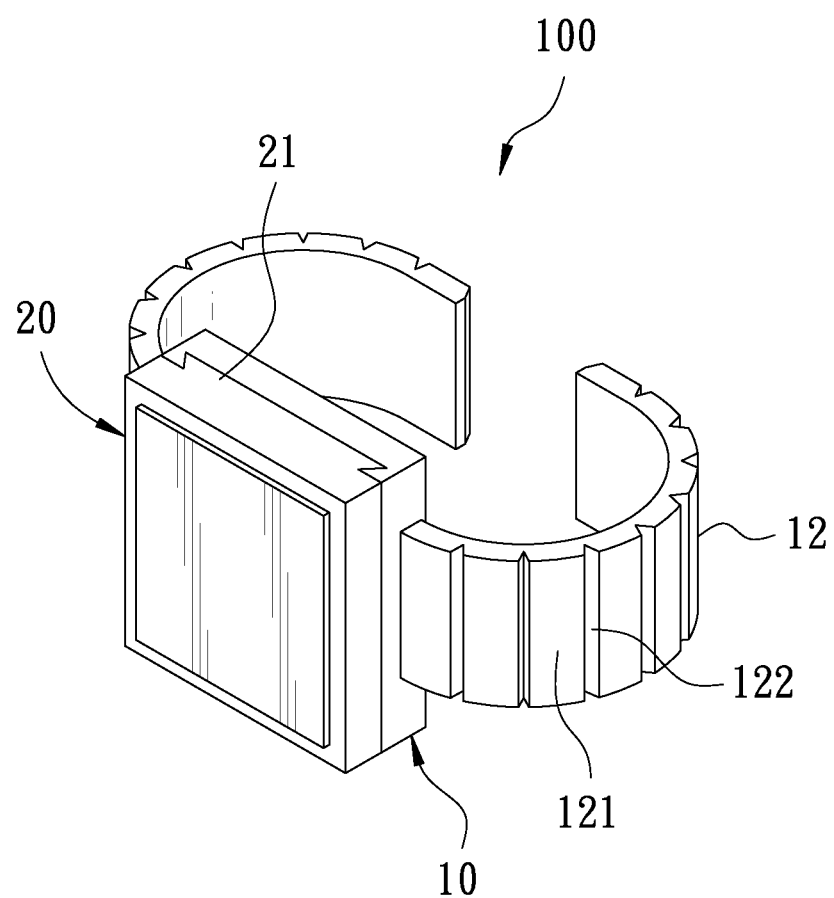
FIG. 1 is a perspective view of the present invention.
Figure 2:
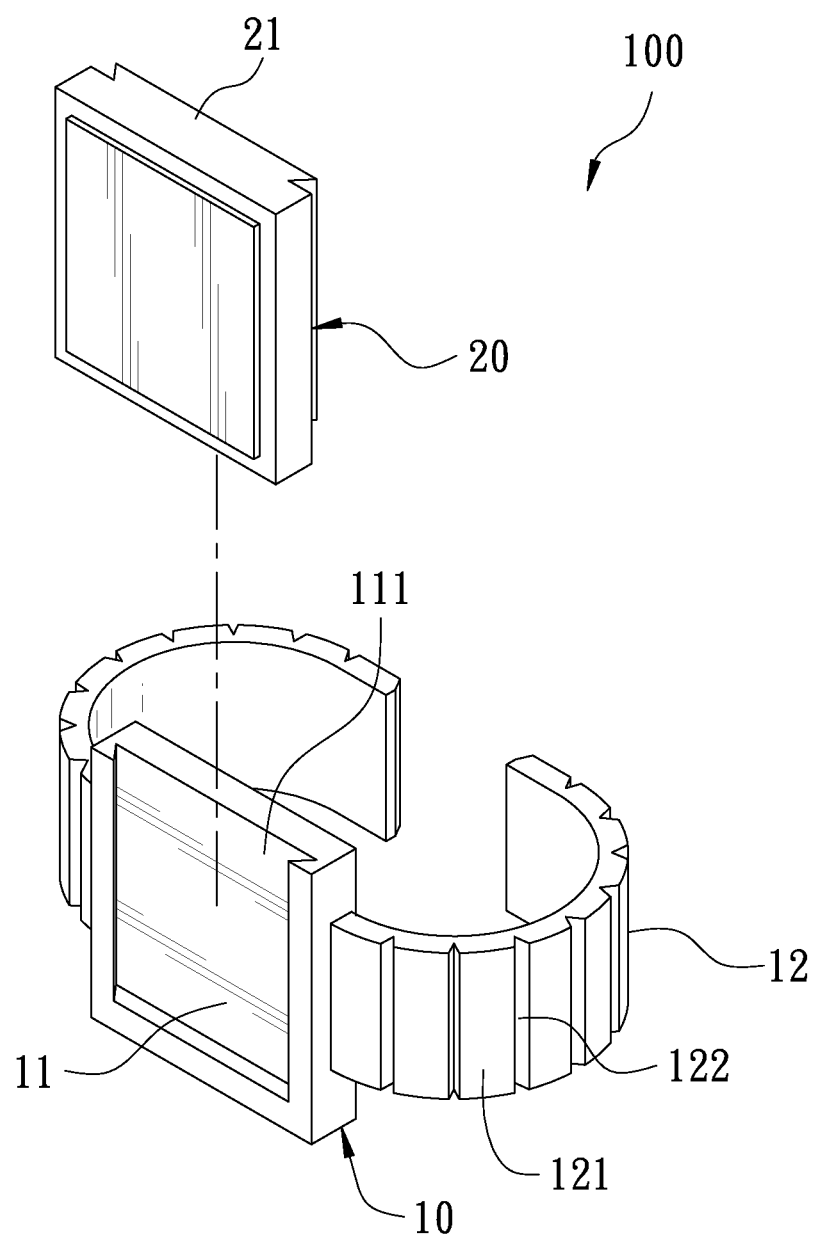
FIG. 2 is an exploded view of the present invention.
Figure 3:
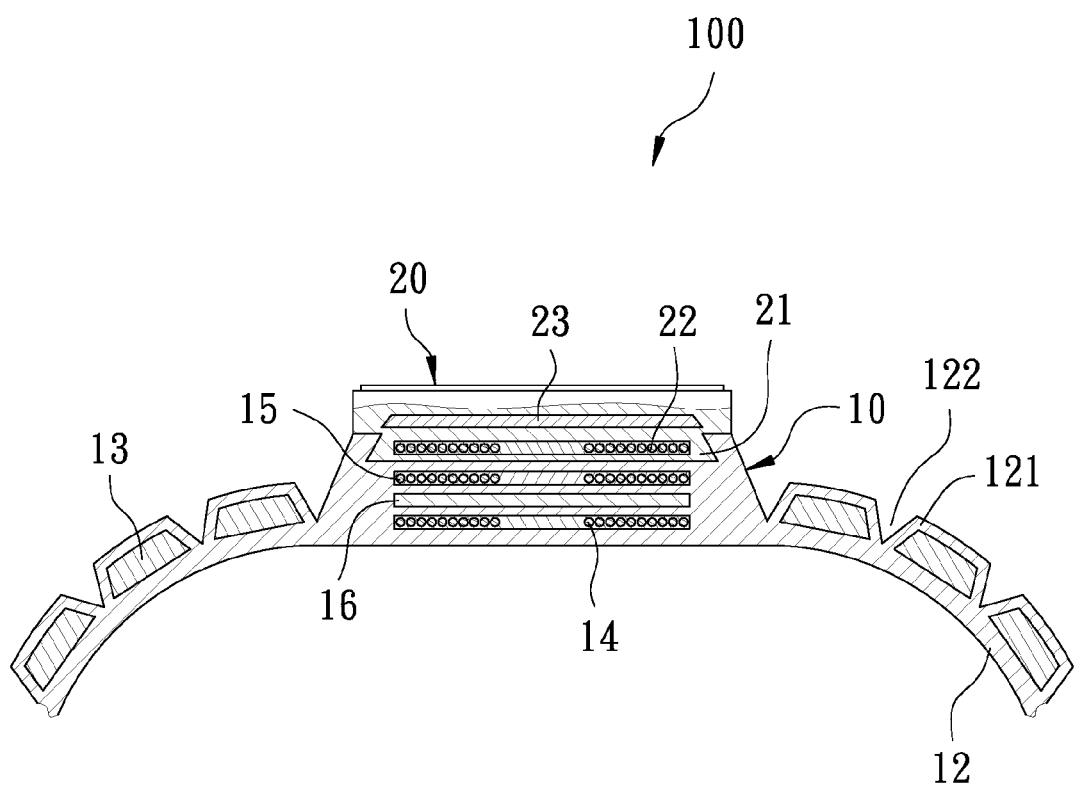
FIG. 3 is a sectional view of the present invention.

FIG. 1 is a perspective view of the present invention. FIG. 2 is an exploded view of the present invention. FIG. 3 is a sectional view of the present invention. The present invention discloses a wireless charge wristband-type mobile communication device 100. The wireless charge wristband-type mobile communication device 100 comprises a base 10 and a display 20.

The top of the base 10 has an engaging trough 11. The engaging trough 11 has a trapezoid cross-section, namely, the engaging trough 11 is gradually enlarged from an upper opening to a bottom side thereof. One side of the engaging trough 11 extends to a circumferential side of the base 10. The circumferential side of the base 10 is formed with an insertion opening 111. Two sides of the base 10 are provided with a pair of wristbands 12. The wristbands 12 are made of a waterproof material, able to resist water. Each wristband 12 is provided with a plurality of protruding blocks 121 arranged along a long axis thereof. The protruding blocks 121 are formed with a plurality of V-shaped grooves 122 therebetween. The V-shaped grooves 122 stride across a short axis of each wristband 12. Through the V-shaped grooves 122, the wristbands 12 form a multi-section crawler structure. Through the V-shaped grooves 122, the wristbands 12 are flexible. It is noted that the V-shaped grooves 122 are not limited to be disposed on the outer side of each wristband 12. The V-shaped grooves 122 can be disposed on the inner side of each wristband 12 for the wristband 12 to form a multi-section front crawler structure or a rear crawler structure. Each protruding block 121 is provided with a first battery 13 therein. The first batteries 13 of the protruding blocks 121 are electrically connected with one another, and they are rechargeable and able to store electrical energy. A first charge coil 14 is provided and embedded in the bottom of the base 10. The first charge coil 14 is electrically connected with the first batteries 13 for external wireless charge and transmitting the electrical energy to the first batteries 13. The top of the base 10 is provided with a power supply coil 15 embedded above the first charge coil 14. The power supply coil 15 is electrically connected with the first batteries 13, such that the electrical energy of the first batteries 13 can be transmitted wirelessly. In the present invention, a separator 60 is provided in the base 10. The separator 60 is disposed between the first charge coil 14 and the power supply coil 15 to isolate magnetic fields of the first charge coil 14 and the power supply coil 15 and prevent electromagnetic interference.

The display 20 is provided with an engaging block 21 corresponding to the engaging trough 11. The engaging block 21 has a trapezoid cross-section, namely, the engaging block 21 is gradually enlarged from a top side to a bottom side thereof. Thus, the engaging block 21 is coupled to the engaging trough 11. A second charge coil 22 is provided and embedded in the bottom of the display 20 for external wireless charge and receiving the electrical energy transmitted by the power supply coil 15. The display 20 is provided with a second battery 23 therein. The second battery 23 is electrically connected with the second charge coil 22. The second battery 23 is rechargeable and able to store the electrical energy.

Referring to FIG. 1 to FIG. 3, by using a wireless power supply device, mains electricity is transmitted to the first charge coil 14 in the way of electromagnetic induction through the primary coil of the wireless power supply device, and then the electrical energy is transmitted to the first batteries 13 through the first charge coil 14 for supplying the required electrical energy to the display 20. After that, the engaging block 22 of the display 20 is inserted through the insertion opening 111 of the engaging trough 11 for the display 20 to be engaged in the engaging trough 11, such that the display 20 is coupled to the base 10, as shown in FIG. 1. At this time, the base 10 uses the power supply coil 15 to transmit the electrical energy stored in the first batteries 23 in the way of electromagnetic induction to the second charge coil 22 of the display 20 and the electrical energy is stored to the second battery 23, such that the display 20 can proceed with electrical energy transmission.

Accordingly, the user can wear the wireless charge wristband-type mobile communication device 100. Through the power supply coil 15 of the base 10, the display 20 can be charged anytime and anywhere. During electrical energy transmission of the display 20, the user can take the display 20 along at will. It is convenient to carry and use the display 20, and the safety to use the display 20 can be improved.

It is noted that mains electricity can be transmitted to the second charge coil 22 in the way of electromagnetic induction through the primary coil of the wireless power supply device, and then the electrical energy is transmitted and stored to the second battery 23, such that the display 20 can be charged directly.

It is noted that the wristbands 12 are provided with the plurality of protruding blocks 121. Each protruding block 121 is provided with the first battery 13. Thus, the base 10 can supply more electrical energy to the display 20.

It is further noted that the wireless charge wristband-type mobile communication device 100 can be in different colors. The width and size of the wristbands 12 of the wireless charge wristband-type mobile communication device 100 are changeable, and the size and shape of the base 10 are changeable to mate with the display 20. Thus, the wireless charge wristband-type mobile communication device 100 has more diversity and choice.

The features and expected effects of the present invention are described as follows:

1. The wireless charge wristband-type mobile communication device 100 of the present invention is provided with the power supply coil 15 embedded in the base 10. The display 20 is coupled to the base 10 through the engaging trough 11. Through electromagnetic induction to transmit the electrical energy, the display 20 can proceed with electrical energy transmission anytime and anywhere. During electrical energy transmission of the display 20, the user can take the display 20 along at will. It is convenient to carry and use the display 20, and the safety to use the display 20 can be improved.

2. The engaging trough 11 of the wireless charge wristband-type mobile communication device 100 of the present invention is adapted for the display 20 to be selectively engaged on the base 10, so that the user can change the display 20 to be coupled with the base 10 at will.

3. The wireless charge wristband-type mobile communication device 100 of the present invention has the engaging trough 11 for the display 20 to be selectively engaged on the base 10 and uses the first charge coil 14 and the power supply coil 15 to transmit the electrical energy in the way of electromagnetic induction so that the display 20 and the base 10 are coupled without any connection points for electrical energy transmission. The display 20 can be used more conveniently, and the safety to use the display 20 can be enhanced.

4. The wireless charge wristband-type mobile communication device 100 of the present invention uses the second charge coil 22 of the display 20 and the primary coil of the wireless power supply device to transmit the electrical energy in the way of electromagnetic induction. The display 20 can be used more conveniently and the safety to use the display 20 can be enhanced.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A wireless charge wristband-type mobile communication device, comprising:
   a base, a top of the base having an engaging trough, two sides of the base being provided with a pair of wristbands, each wristband being provided with at least one first battery therein, the first battery being rechargeable and able to store electrical energy, a first charge coil being provided and embedded in a bottom of the base, the first charge coil being electrically connected with the first battery for external wireless charge and transmitting the electrical energy to the first battery, the top of the base being provided with a power supply coil embedded above the first charge coil, the power supply coil being electrically connected with the first battery, enabling the electrical energy of the first battery to be transmitted wirelessly; and
   a display, the display being provided with an engaging block corresponding to the engaging trough, the engaging block being coupled to the engaging trough, a second charge coil being provided and embedded in a bottom of the display for external wireless charge and receiving the electrical energy transmitted by the power supply coil, the display being provided with a second battery therein, the second battery being electrically connected with the second charge coil, the second battery being rechargeable and able to store the electrical energy;

thereby, the base being first charged wirelessly by means of external power supply and then the display being charged wirelessly by means of the base or the display being directly charged wirelessly by means of external power supply.

2. The wireless charge wristband-type mobile communication device as claimed in claim 1, wherein the engaging trough is gradually enlarged from an upper opening to a bottom side thereof, and the engaging block corresponds in shape to the engaging trough and is gradually enlarged from a top side to a bottom side thereof.

3. The wireless charge wristband-type mobile communication device as claimed in claim 1, wherein one side of the engaging trough extends to a circumferential side of the base, and the circumferential side of the base is formed with an insertion opening for insertion of the engaging block.

4. The wireless charge wristband-type mobile communication device as claimed in claim 1, wherein a separator is provided in the base, and the separator is disposed between the first charge coil and the power supply coil to isolate magnetic fields of the first charge coil and the power supply coil and prevent electromagnetic interference.

* * * * *